United States Patent [19]
Tanibata

[11] Patent Number: 5,867,252
[45] Date of Patent: Feb. 2, 1999

[54] IMAGE PRINTER

[75] Inventor: Toru Tanibata, Wakayama-ken, Japan

[73] Assignee: Noritsu Koki Co., Ltd., Japan

[21] Appl. No.: 947,553

[22] Filed: Dec. 12, 1996

Related U.S. Application Data

[63] Continuation of Ser. No. 247,801, May 23, 1994, abandoned.

[30] Foreign Application Priority Data

May 28, 1993 [JP] Japan .................................. 5-126685

[51] Int. Cl.$^6$ ...................................................... G03B 27/80
[52] U.S. Cl. ................................................ 355/38; 355/41
[58] Field of Search ................................ 355/38, 40, 41, 355/67, 71

[56] References Cited

U.S. PATENT DOCUMENTS

| | | | |
|---|---|---|---|
| Re. 34,362 | 8/1993 | Klosterhuber et al. | 355/40 |
| 4,979,032 | 12/1990 | Alessi et al. | 358/76 |
| 5,075,716 | 12/1991 | Jehan et al. | 355/38 |
| 5,084,727 | 1/1992 | Maronian et al. | 355/71 |
| 5,206,684 | 4/1993 | Wada et al. | 355/203 |
| 5,210,570 | 5/1993 | Minamisawa et al. | 355/38 |
| 5,253,011 | 10/1993 | Zahn et al. | 355/41 |

FOREIGN PATENT DOCUMENTS

| | | |
|---|---|---|
| A-0 227 065 | 7/1987 | European Pat. Off. . |
| A-0 255 128 | 2/1988 | European Pat. Off. . |
| A-0 433 232 | 6/1991 | European Pat. Off. . |
| A-0 514 909 | 11/1992 | European Pat. Off. . |
| 3-58096 | 10/1984 | Japan . |
| 63-189262 | 8/1988 | Japan . |
| 1-291236 | 11/1989 | Japan . |
| A-2 202 707 | 9/1988 | United Kingdom . |

Primary Examiner—Daniel P. Malley
Attorney, Agent, or Firm—Townsend and Townsend and Crew LLP

[57] ABSTRACT

An image printer includes a projection exposure unit for projecting and exposing a film image on to a photosensitive material, an image exposure unit for exposing the photosensitive material based on exposure image information with setting an exposure amount for each of a plurality of areas, an image reader for reading information of the film image with the information being divided into a number of areas, and a correction-information instructing unit for instructing correction information for correcting the image information read by the image reader. The image exposure unit generates the exposure image information based on the image information read by the image reader means and on the correction information instructed by the correction-information instructing unit.

6 Claims, 4 Drawing Sheets

(a)

(b)

IMAGE PRINTER

This is a Continuation of application Ser. No. 08/247,801 filed May 23, 1994, now abandoned.

BACKGROUND OF THE INVENTION

1. Field of the Invention

This invention relates to an image printer.

2. Description of the Related Art

As an image printer for exposing a photosensitive material with an image recorded on a film, there is generally used an image printer for projecting and exposing the film image on to the photosensitive material.

With such image printer, if the image quality of the image recorded on the film is not favorable, correction for improving the image quality is possible in the projection-exposure of the photosensitive material.

This correction for image quality improvement includes correction of contrast and correction of color tone. As specific methods of such correction, in the case of correction of contrast, the correction has been effected by inserting, into an optical path extending from the film to the photosensitive material, a mask having a shape corresponding to a portion of the film image to be corrected, thereby to adjust the amount of light passage.

For the correction of color tone, there has been used, as the mask, a filter capable of inhibiting a light component of a particular color.

According to the conventional image printer, a film image is projected and exposed on to the photosensitive material, with effecting the above-described correction when necessary. On the other hand, in the case of a film image not requiring such correction, this film image is projected and exposed as it is.

Therefore, according to the conventional art, in the case of the film image which does not require any correction, the film image as it is may be projected and exposed on to the photosensitive material, such that a high-speed exposure operation is possible. However, in case a correction of the film image is needed, it is necessary to prepare a mask for each film image which requires a correction. As a result, the exposure operation requires a significant amount of time and labor, thereby to considerably reduce the exposure operation efficiency.

The present invention attends to the above-described state of the art. A primary object of the present invention is to provide an image printer with improved exposure operation efficiency by facilitating the correction of the film image when needed while retaining the advantage of the possibility of a high-speed exposure operation by projection and exposure of a film image which does not require any correction.

SUMMARY OF THE INVENTION

For fulfilling the above-noted object, an image printer, according to the present invention, comprises:

a projection exposure unit for projecting and exposing a film image on to a photosensitive material;

an image exposure unit for exposing the photosensitive material based on exposure image information with setting an exposure amount for each of a plurality of areas;

reader means for reading information of the film image with the information being divided into a number of areas; and correction-information instructing means for instructing correction information for correcting the image information read by the reader means;

wherein said image exposure unit generates said exposure image information based on said image information read by said reader means and on said correction information instructed by said correction-information instructing means.

According to the above-described construction, in case no film image correction is needed, the exposure operation of this film image is effected speedily at the projection exposure unit by directly projecting and exposing the film image onto the photosensitive material during the projection exposure mode. Whereas, in case the film image requires a correction, this correction operation is first effected and then an exposure operation of this corrected image is effected at the image exposure unit during the image exposure mode.

In the above-described correction operation, the exposure image information is produced based on the film image information read by the reader means and on the correction information instructed by the correction-information instructing means. Then, based on this produced exposure image information, an exposure amount is set for each of the plurality of areas together constituting the image information; and the photosensitive material is exposed with these set exposure amounts.

To describe this film image correction more specifically, based on the image information read by the reader means, the exposure image information based on which the exposure amount for each area is set is produced. In the course of this process, the image information is corrected based on the correction information instructed from the correction-information instructing means.

As described above, while the film image information read by the reader means is corrected based on the correction information instructed by the correction-information instructing means, there is produced the exposure image information for exposing the photosensitive material at the image exposure unit. As a result, the invention has achieved the intended object of providing an image printer with improved exposure operation efficiency by facilitating the correction of the film image when needed while retaining the advantage of the possibility of a high-speed exposure operation by projection and exposure of a film image which does not require any correction.

According to one aspect of the present invention, a monitor device is provided for displaying the image information read by the reader means.

With this, when the reader means reads the film image information, the monitor device displays this read image information. Then, by viewing this monitor display, an operator may judge whether the film image requires a correction or not. Further, the operator may also confirm whether the reader means is functioning properly or not. In these manners, the operator may obtain a lot of information from the monitor display. Therefore, the image printer provided with this further feature will be more convenient.

According to a further aspect of the present invention, there is provided a monitor device for displaying the exposure image information produced at the image exposure unit.

With the above-described construction, when the exposure image information is produced at the image exposure unit based on the image information read by the reader means and on the correction information instructed by the correction-information instructing means, this exposure image information is displayed on the monitor device. Then, by viewing this monitor display, the operator may confirm whether a proper image has been obtained by the correction or not, or whether the correction function is properly operating or not. In these manners, the operator may obtain a great amount of information from the monitor display.

As a result, the image printer with this feature will prove even more convenient.

According to a still further aspect of the present invention, the correction-information instructing means provides the correction information based on input information from correction-information inputting means for inputting correction contents.

With the above-described construction, when the correction contents are inputted from the correction-information inputting means, the correction-information instructing means instructs the correction information based on the inputted correction contents. Thus, based on the correction contents inputted from the correction-information inputting means, the film image information read by the reader means is corrected to produce the exposure image information.

As a result, by inputting the correction contents from the correction-information inputting means, the film image information read by the reader means may be corrected in a desired manner. Thus, the image printer with this further feature will prove even more convenient.

According to a still further aspect of the present invention, the correction-information instructing means instructs the correction information by automatically discriminating the correction contents of the image information based on the image information read by the reader means.

With the above-described construction, as the reader means reads the film image information, the correction-information instructing means determines the correction contents of this read image information and then instructs the correction information based on the correction contents. Thus, based on the correction contents automatically discriminated by the correction-information instructing means, the film image information read by the reader means is corrected to produce the exposure image information.

The image printer with this further feature of the automatic discrimination of the correction contents by the correction-information instructing means will prove even more convenient.

According to a still further aspect of the present invention, the image printer further comprises:

transport means for transporting the photosensitive material through the projection exposure unit and the image exposure unit;

a control unit for controlling the operations of the projection exposure unit, the image exposure unit and the transport means; and exposure mode instructing means for instructing the control unit to be switched over between a projection exposure mode and an image exposure mode;

with an instruction for the projection exposure mode, the control unit executing control operations for exposing the photosensitive material at the projection exposure unit; while, with an instruction for the image exposure mode, the control unit executing further control operations for exposing the photosensitive material at the image exposure unit.

The correction of the film image information is effected in case the image exposure mode of the two operation modes is selectively instructed.

As a result, since the projection exposure unit and the image exposure unit commonly use the transport means and are properly controlled by the operation mode instruction from the exposure mode instructing means, the image printer will be move convenient, with restricting complexity of its construction.

According to a still further aspect of the present invention, the reader means is disposed so as to read the image information of the film charged to film feed means for feeding the film to the projection exposure unit.

With this construction, the reader means reads the image information of the film charged to the film feed means in association of the film feeding operation of this film feed means. Then, based on this read image information, the image exposure unit is operated.

As a result, since the reader means reads the image information of the film charged to the film feed means, the projection exposure unit and the image exposure unit may commonly use the film feed means, so that it becomes unnecessary to distinguish the film charging position at the two exposure units.

Although the reading operation of the film image information by the reader means requires a relative movement between the reader means and the film, the reader means may read the film image information by utilizing the film feeding operation by the film feed means.

With the above, through the restriction of complexity of the device construction, the image printer will be even more convenient.

According to a still further aspect of the present invention, the exposure mode instructing means is adapted to effect an automatic selection between the projection exposure mode and the image exposure mode and to instruct either selected mode based on the image information read by the reader means.

With the above arrangement, when the reader means reads the film image information, based on this read film image information, the exposure mode instructing means automatically selects either the projection exposure mode or the image exposure mode and then instructs the selected exposure mode to the control unit. Thereafter, in accordance with this instruction from the exposure mode instructing means, the control unit controls the projection exposure unit and the image exposure unit.

As a result, since based on the read image information the exposure mode instructing means automatically selects either the projection exposure mode or the image exposure mode and instructs this selected mode to the control unit, no setting of the operation mode is necessary. Thus, the image printer with this feature will be even more convenient.

Further and other objects, features and effects of the invention will become apparent from the following more detailed description of the embodiments of the invention with reference to the accompanying drawings.

DESCRIPTION OF THE PREFERRED EMBODIMENTS

Now, preferred embodiments of an image printer according to the present invention will be described in details with reference to the accompanying drawings.

Figure 1:
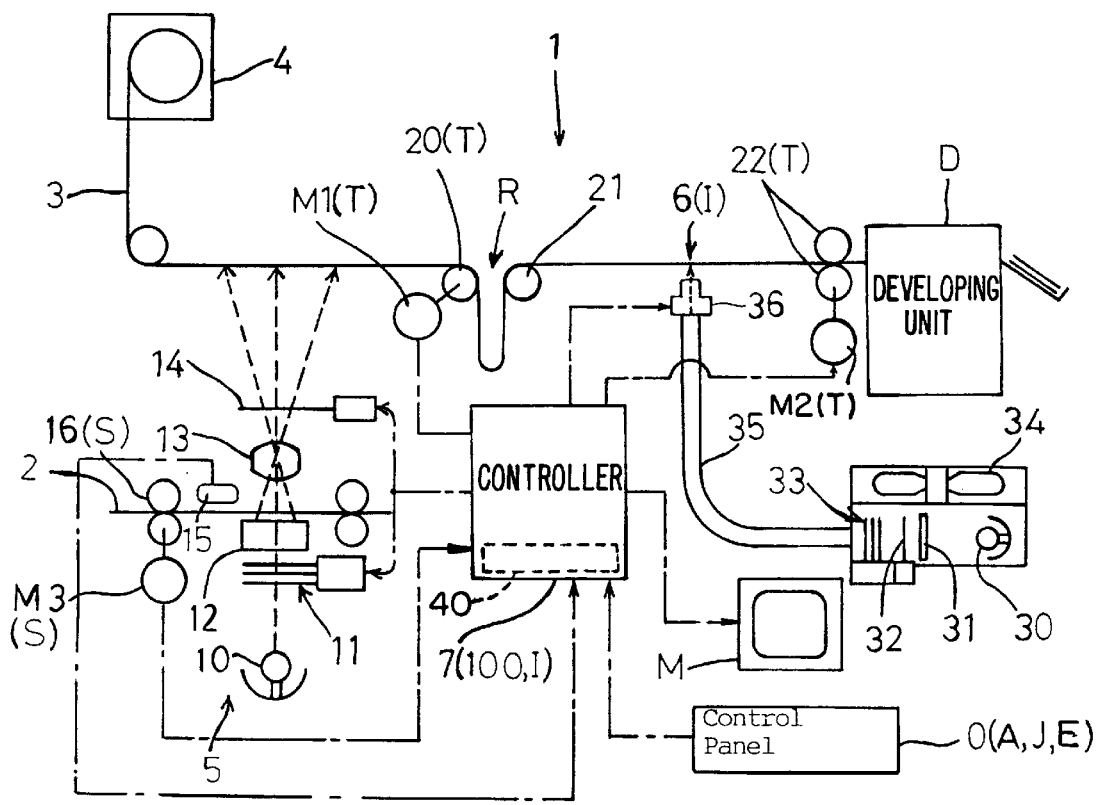
FIG. 1 is a schematic construction view of an image printer relating to one preferred embodiment of the present invention.

As shown in FIG. 1, an image printer 1 includes a projection exposure unit 5 for projecting and exposing image information of a film 2 on to a print paper 3 as a photosensitive material, a moving exposure unit 6 for dividing the image information to be exposed on to the print paper 3 into a plurality of lines and then exposing each line, a loop forming unit R for allowing a transporting operation of the print paper 3 at the projection exposure unit 5 and the moving exposure unit 6 independently of each other, a developing unit D for developing the print paper 3 having been exposed at either the projection exposure unit 5 or the moving exposure unit 6, and a controller 7 for controlling the above-described components of the image printer 1. This controller 7 is connected to a control panel O for effecting various instruction input operations and to a monitor device M for displaying the image information.

Then, after the print paper 3 is withdrawn from a print paper holder 4 in which the printer paper 3 is stored in a rolled state, the print paper 3 is exposed at either the projection exposure unit 5 or the moving exposure unit 6 and then is developed at the developing unit D. Then, the print paper 3 is cut into a paper strip including one-frame amount of image information and discharged from the image printer 1.

This image printer 1 operates in two modes, i.e. a projection exposure mode and an image exposure mode. In the case of the projection exposure mode, the image of the film 2 is projected and exposed on to the print paper 3 at the projection exposure section 5. In the case of the image exposure mode, a moving exposure operation of the image information of the film 2 is effected on to the print paper 3 at the moving exposure unit 6. Further, when the image printer 1 operates under the image exposure mode, to be described more specifically later, it is possible to correct the contrast of the image of the film 2 to be exposed on to the print paper 3. Which of these two operation modes to be effected is selected by an input of instruction from the control panel O.

Next, the respective components will be specifically described.

The projection exposure unit 5 includes a projection exposure light source 10, a light modulating filter 11 for adjusting color balance of the light to be irradiated on to the film 2, a mirror tunnel 12 for uniformly mixing color components of the light having passed the light modulating filter 11, a printing lens 13 for printing the image information of the film 2 on to the print paper 3, and a shutter 14, with these components being arranged along a same optical path.

On the upstream side of the transport passage of the film 2 relative to the projection exposure unit 5, there is disposed an image sensor 15 for reading the image information of the film 2 with the information being divided into a number of areas. This image sensor 15 irradiates white beam on to the film 2, resolves its reflected or transmission light into three primary color components of red, green and blue, so that intensity of each component is measured by e.g. a CCD line sensor. The image information read by this image sensor 15 is used both in exposure at the projection exposure unit 5 and in exposure at the moving exposure unit 6.

On the upstream side of the transport passage of the film 2 relative to the image sensor 15, there are disposed a roller 16 for feeding the film 2 to the projection exposure unit 5 and a motor M3 for rotatably driving the roller 16.

At the projection exposure unit 5, based on the image information read by the image sensor 15 in association with the feeding operation of the film 2 by the roller 16 and the motor M3, the controller 7 controls the light modulating filter 11 to adjust the irradiation beam of the projection exposure light source 10 to a color balance according to the color densities of the image of the film 2. Thereafter, this adjusted light is irradiated to the film 2 so as to print the image information of the film 2 on to the print paper 3.

The loop forming unit R includes rollers 20, 21 for transporting the print paper 3 and a motor M1 for rotatably driving the roller 20. Between the roller 20 disposed on the upstream side of the print paper transporting direction and the roller 21 disposed on the downstream side of the print paper transporting direction, though not shown, there is interposed a flap switchable between a condition for linearly guiding the print paper 3 between the rollers 20, 21 and a further condition for allowing formation of a loop of the print paper 3 as shown in FIG. 1. With the formation of the loop, transport speeds of the print paper 3 at the projection exposure unit 5 and the moving exposure unit 6 may be set independently of each other.

The moving exposure unit 6 includes an exposure light source 30, an IR cut filter 31 for eliminating infrared beam component from the light emitted from the exposure light source 30, a shutter 32, a light modulating filter 33 for adjusting color balance of the light from the exposure light source 30, a PLZT print head 36, and an optical fiber bundle 35 for transmitting the light from the exposure light source 30 to the PLZT print head 36. And, the exposure light source 30, the IR cut filter 31, the shutter 32 and the light modulating filter 33 are accommodated inside a single casing together with a cooling fan motor 34.

The light modulating color filter 33 includes color filters of yellow (Y), magenta (N) and cyanogen (C), with the filters being independently projectable into and retractable from an optical path. Then, with projecting and retracting movements of the respective color filters, the light from the exposure light source 30 is switched over to one of exposing colors of e.g. red, green and blue.

The PLZT print head 36, though not shown, includes a great number of assemblies each consisting of PLZT interposed between a polarizer and an analyzer, with the assemblies being linearly arranged in a direction perpendicular to the transporting direction of the print paper 3. Then, by varying a voltage to be impressed to a pair of electrodes attached to each PLZT, the polarizing direction of the light passing between the electrodes is varied so as to selectively allow or inhibit the passage of the light through each PLZT. In this manner, the print head functions as a light shutter.

With the above, through the independent control of the voltages to be applied to the great number of PLZT and the switch-over of the light modulating filter 33 to a desired exposing color corresponding to the three primary color components of red, green and blue, an exposure amount is set for each of the areas together constituting the image information with respect to one-line amount of this image information, thereby to effect color exposure of the print paper 3.

On the downstream side of the print paper transporting passage relative to the moving exposure unit 6, there are disposed a roller 22 for transporting the print paper 3 and a motor M2 for driving this roller 22.

Under the control of the controller 7, at the moving exposure unit 6, the motor M2 and the moving exposure unit 6 effect exposure of one-line amount of image information after another on to the print paper 3 with switching over the exposing colors. With completion of the exposures with all the exposing colors, by the drive of the motor M2, the roller 22 repeats transport of the print paper 3 by a distance corresponding to the one-line amount, with shifting the image information by one-line amount, so as to expose the print paper 3 with one-frame amount of image information.

The developing unit D, though not shown, includes a plurality of tanks filled with processing liquids for developing the exposed print paper 3. Thus, the print paper 3 is developed with its successive passage through these tanks.

Figure 2:
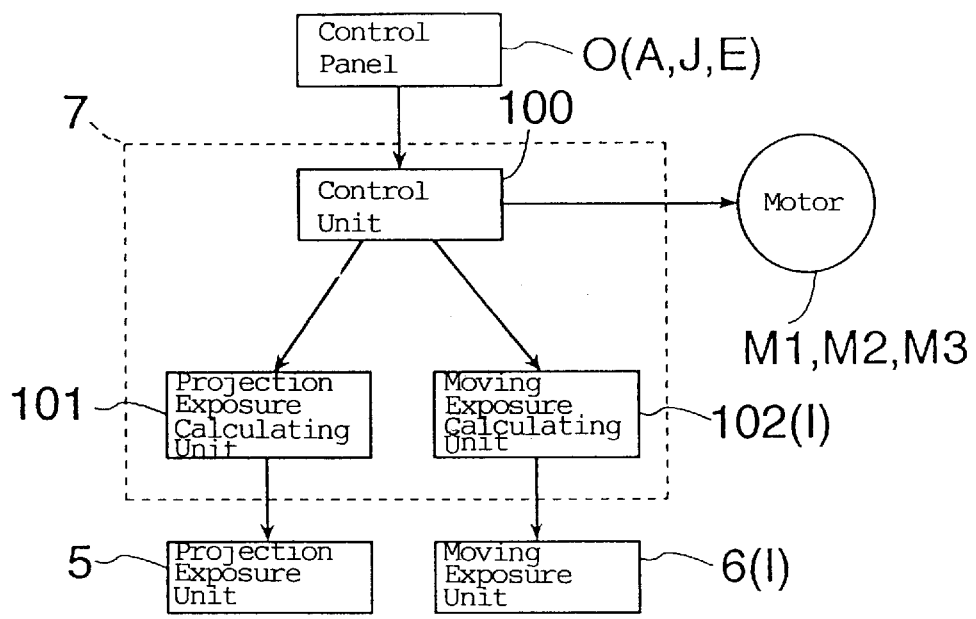
FIG. 2 is a diagram of a control unit.

The controller 7, as shown in FIG. 2, incudes a projection exposure calculating unit 101 for executing calculation of image information relating to the projection exposure unit 5, a moving exposure calculating unit 102 for executing calculation of image information relating to the moving exposure unit 6, and a control unit 100 for executing total control of the operations of these calculating units 101, 102 and the operations of the projection exposure unit 5 and the moving exposure unit 6. In addition, the controller 7 further executes control of the operations of the respective motors M1, M2 and M3. These functions are stored as one integral program at a memory 40 incorporated within the controller 7. The memory 40 further stores other information such as the image information read by the image sensor 15.

Figure 3:
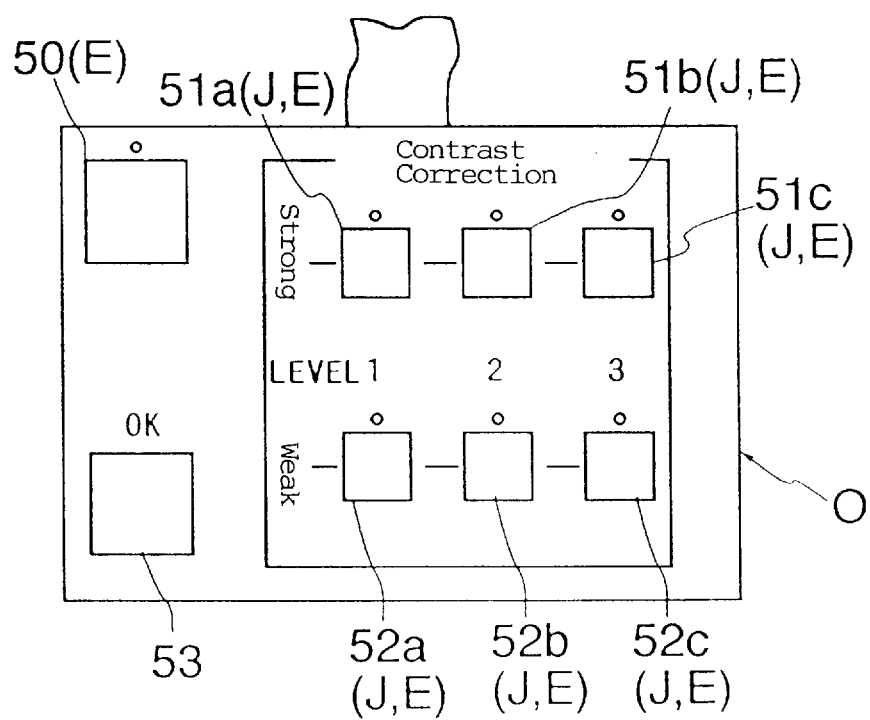
FIG. 3 is a view showing a control panel.

The control panel 0 connected to the controller 7, as shown in FIG. 3, includes a projection exposure key 50 for projecting/exposing the image of the film 2 at the projection exposure unit 5, contrast correction keys 51a, 51b, 51c for adjusting a correction amount of the contrast in the increasing direction in three steps of levels 1 through 3, and further contrast correction keys 52a, 52b, 52c for adjusting a correction amount of the contrast in the decreasing direction in three steps of levels 1 through 3. In either case, the level 1 is for the smallest amount of correction.

The control unit 100 of the controller 7 judges that the projection exposure mode has been instructed if the projection exposure key 50 of the above-described keys is depressed. On the other hand, the unit judges that the image exposure mode has been instructed if any one of the contrast correction keys 51a, 51b, 51c, 52a, 52b, 52 is depressed.

Next, the control schemes executed by the controller 7 for controlling the operations of the respective components will be described with reference to a flow chart of FIG. 4.

First, the image information of the film 2 fed to the projection exposure unit 5 by feeding operations using the roller 16 and the motor M3 is read by the image sensor 15 as information of densities of the red, green, blue, three primary color components (step #1). Then, this read image information is calculated to be converted into data to be displayed on the monitor device M (step #2). In the course of this, if the film 2 comprises a negative film, it is necessary to convert the information of densities of the three primary color components into density information of the respective complementary color components.

With completion of the above-described calculation, based on the calculation result, the image information is displayed on the monitor device M (step #3). By viewing this display on the monitor device M, the operator may judge whether the image of the film 2 needs contrast correction nor not and then effects an instruction input from the control panel 0.

Next, it is judged whether the operation mode of the image printer 1 is presently set to the image exposure mode or to the projection exposure mode (step #4). If it is judged that the mode is set to the projection exposure mode with depression of the projection exposure key 50; then, by using the calculation result obtained at step #2, the light modulating filter 11 is controlled to an optimal color balance (step #5).

Thereafter, by using the calculation result obtained at step #2, an exposure time period is calculated (step #6). Then, based on the calculation result of this exposure time period, the shutter 14 is operated to expose the print paper 3 (step #7).

On the other hand, if it is judged at step #4 that the mode is presently set to the image exposure mode with depression of any one of the contrast correction keys 51a, 51b, 51c, 52a, 52b, 52c, the image information of the film 2 read by the image sensor 15 is added with contrast correction information to generate exposure image information (step #8).

Next, the process executed at this step #8 will be briefly described.

Figure 5:
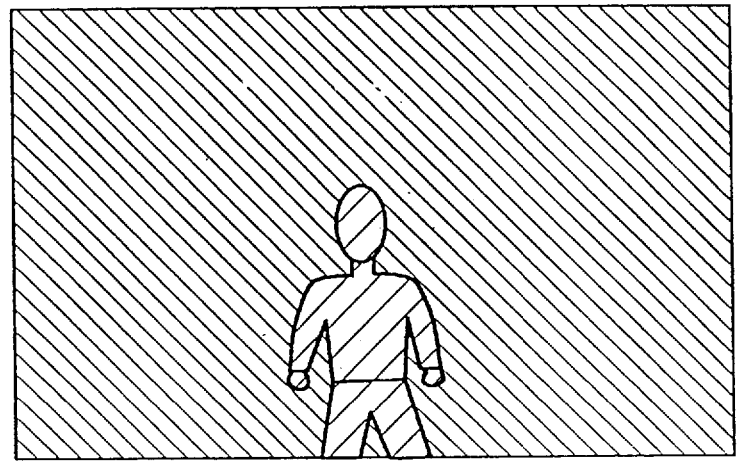
FIG. 5 is a view for explaining an image information correction process.
Figure 5:
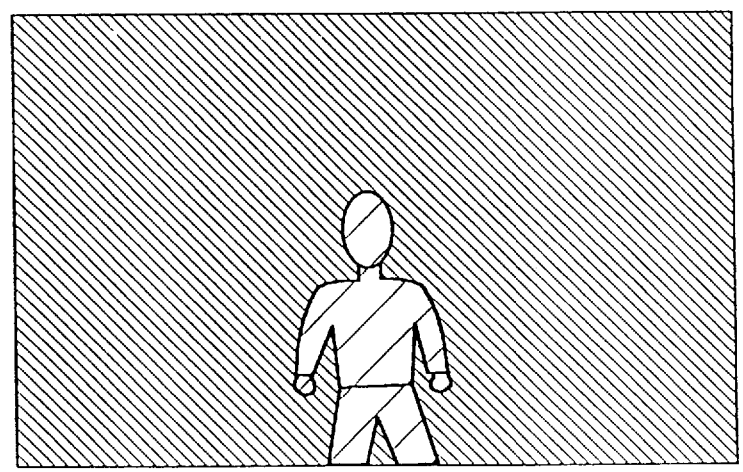

For instance, if a negative film is used as the film 2 for photographing a human subject in a whitish garment with a whitish background, the image information of this film 2 will be as shown in FIG. 5(a) in which there is an overall distribution concentration toward the higher side in the density information which is one kind of the image information of the film 2. In such case, a contrast enhancing operation will be desired. Hence, supposing that the operator as viewing the display on the monitor device M has depressed one of the contrast correction keys 51a, 51b, 51c for setting the correction amount in the contrast increasing side, a calculation of the density information will be effected in the direction for expanding the distribution unevenness. With this, there will be obtained exposure image information as shown in FIG. 5(b) which has an increased density in the portion corresponding to the whitish background and a reduced density in the further portion corresponding to the whitish garment of the human subject. Thus, this exposure image information is provided with contrast enhancement relative to the image information shown in FIG. 5(a). The degree of this contrast enhancement is determined by which of the contrast correction keys 51a 51b, 51c is depressed.

With completion of the calculation at step #8, the resultant exposure image information is converted into data to be displayed on the monitor device M and then displayed on the monitor device M (step #9).

If the result of the correction displayed on the monitor device M is not good and the operator again depresses one of the contrast correction keys 51a, 51b, 51c, 52a, 52b, 52c; then, the process returns to step #8 to repeat the above-described operations until a satisfactory result is obtained. If the correction result is satisfactory and the operator depresses an OK key 53 of the control panel O; then, the process goes on to the next step (step #10). Thus, the user selects the projection exposure mode of operation by pressing OK key 53 and the image exposure mode of operation by pressing key 50 (followed by the appropriate key 51a–51c, 52a–52c).

With the key operation at step #10 indicating the good correction result, an exposure time period is calculated for each of the three primary color components with respect to each of the plurality of divided areas (step #11). Based on the results of these calculations, the exposure of the print paper 3 is effected at the moving exposure unit 6 in the above-described manner (step #12).

Accordingly, the moving exposure unit 6 and the controller 7 together function as an image exposure unit I for exposing the print paper 3 based on the exposure image information.

The contrast correction keys 51a, 51b, 51c, 52a, 52b, 52c together function as correction information inputting means J. Correction information instructing means A for instructing the correction information to the image exposure unit I is constituted by this correction information inputting means J.

The rollers 20, 21 and 22 and the motors M1, M2 together function as transport means T for transporting the print paper 3 through the projection exposure unit 5 and the moving exposure unit 6. The controller 7 functions as the control unit 100 for controlling the projection exposure unit 5, the image exposure unit I and the transport means T. The roller 16 and the motor M3 together function as film feed means S for feeding the film 2 to the projection exposure unit 5. The image sensor 15 functions as reader means for reading the image information of the film 2.

The projection exposure key 50 and the contrast correction keys 51a, 51b, 51c, 52a, 52b, 52c of the control panel O together function as exposure mode instructing means E for instructing a switch over between the the projection exposure mode and the image exposure mode to the control unit 100.

Next, other embodiments will be specifically described.

(1) In the foregoing embodiment, both the image information of the film 2 read by the image sensor 15 and the exposure image information produced at the image exposure unit I are displayed on the monitor device M. Instead, only one of them may be displayed, or neither of the same may be displayed.

(2) In the foregoing embodiment, the correction information instructing means A instructs the correction information based on the inputted information from the correction information inputting means J. Alternatively, it is conceivable to adapt the control unit 100 to automatically discriminate the correction contents.

In judging whether correction is needed or not, for instance, it will be judged that contrast correction is needed if the image information read by the image sensor 15 includes an area having a density higher than a predetermined density value and there exists a significant variety of density values within this area. Whereas, in the other cases, it will be judged that correction is not needed.

Further, the degree of the correction may be determined depending on the degree of the diversity of the density values in the area having the density value higher than the predetermined density value.

Figure 4:
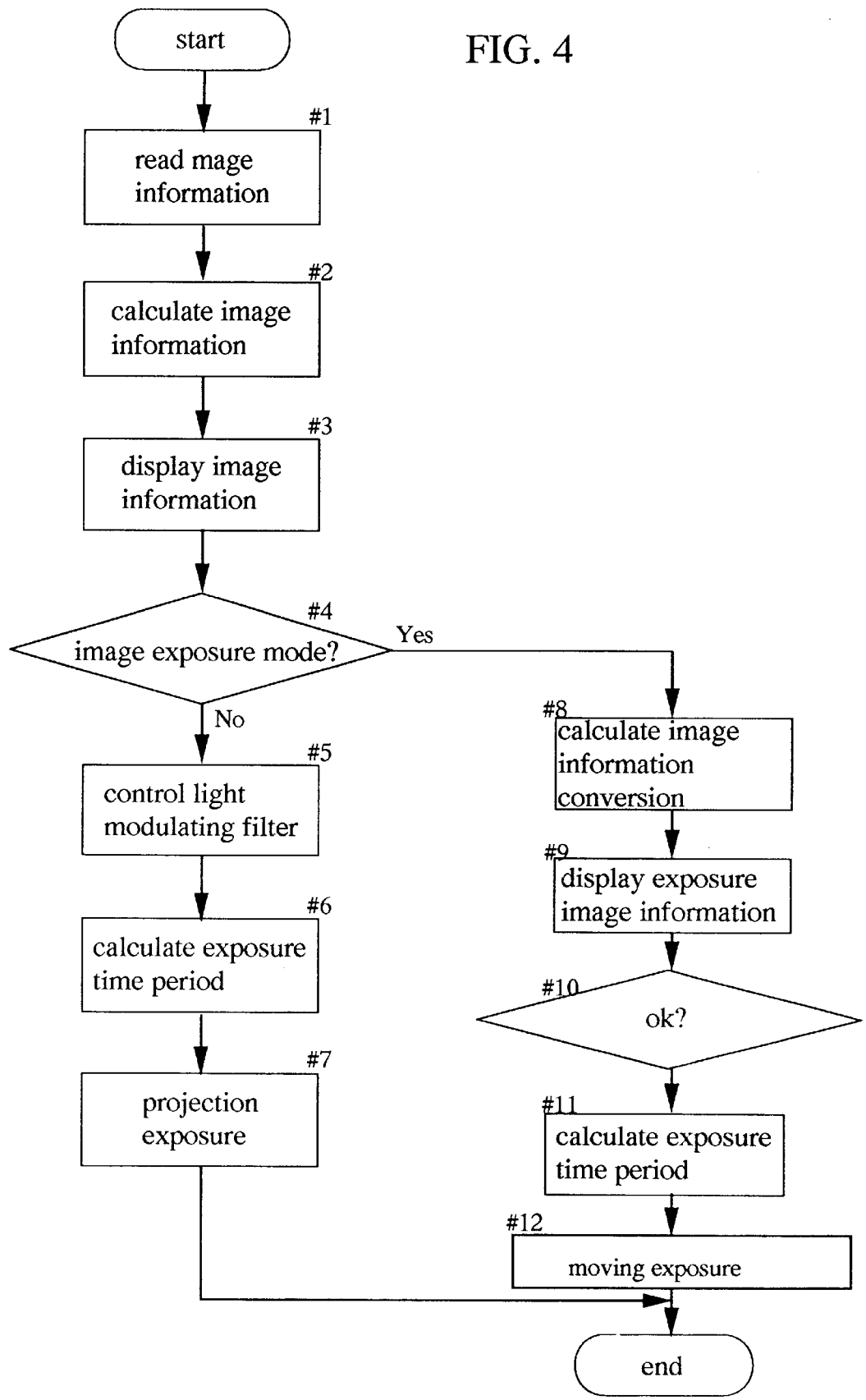
FIG. 4 is a flow chart.

In this case where the control unit 100 effects the automatic discrimination of the correction contents, steps #9 and #10 in the flow chart of FIG. 4 are not necessary.

Further, with the automatic discrimination of the correction contents by the control unit 100, the switch-over operation between the projection exposure mode and the image exposure mode at step #4 may be effected by the control unit 100. In this case, the control unit 100 functions as the exposure mode instructing means E.

(3) In the foregoing embodiment, the correction of the image information read by the image sensor 15 comprises correction of contrast. Instead, any other correction, e.g. correction of color tone may be effected.

(4) In the foregoing embodiment, the moving exposure unit 6 employs the light shutter using PLZT. Instead, a light shutter using liquid crystal elements may be used as the print head.

(5) In the foregoing embodiment, at the moving exposure unit 6, the irradiation light from the exposure light source 30 is guided to the PLZT print head 36 by means of the optical fiber bundle 35. Alternately, the irradiation light from the exposure light source 30 may be converged on to the PLZT print head 36 by means of a lens, for example.

(6) In the foregoing embodiment, in exposing the print paper 3 at the moving exposure unit 6, the one-line amount of exposure operation and the transporting operation of the print paper 3 for one-line amount are repeated in the alternating manner to effect exposure of each line of the image information. Instead of this, the exposure of each line of the image information may be effected one after another while the print paper 3 is being transported in a continuous manner at a fixed speed.

(7) In the foregoing embodiment, since the image exposure mode is selected by a depressing operation of the contrast correction keys 51a, 51b, 51c, 52a, 52b, 52c, the print paper 3 is not exposure at the image exposure unit I if no correction is to be made. However, it is conceivable to provide the control panel O with a further key for instructing exposure of the print paper 3 at the image exposure unit I without any correction.

(8) In the foregoing embodiment, the contrast correction is effected with respect to one-frame amount of image information. Instead, it is conceivable to allow the correction information inputting means J to designate a particular portion of the one-frame amount of image information so that this particular portion may be corrected. Further, it is also conceivable to adapt the control unit 100 to automatically discriminate the particular portion to be corrected of the one-frame amount of the image information.

This automatic discrimination of the particular portion to be corrected may be effected in the similar manner as described in the foregoing further embodiment for the automatic discrimination of the necessity of correction.

The invention may be embodied in other specific forms without departing from the sprit or essential characteristics hereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An image printer for forming an image of a film on to a photosensitive material, comprising:

a projection exposure unit for projecting and exposing the film image on to the photosensitive material, said projection exposure unit including;

a light source, a light modulating filter for modulating light from said light source to be irradiated on the film, and a printing lens for imaging the film image on the photosensitive material;

reader means for reading image information of the film image;

an image exposure unit for exposing the photosensitive material with image information externally received at a position away from said projection exposure unit;

a control unit connected to said projection exposure unit, said image exposure unit as well as to said reader means, said control unit including:

a first exposure calculating unit for calculating a corrected exposure amount from film image information provided from said reader means and also for adjusting said light modulating filter based on said corrected exposure amount, and a second exposure calculating unit for dividing the film image information into a plurality of areas together constituting one frame of the film, then effecting an exposure correction individually on each of said plurality of areas and outputting the corrected film image information to said image exposure unit; and correction information instructing means for instructing correction information to said second exposure calculating unit.

2. An image printer for forming an image of a film on to a photosensitive material, comprising:

a projection exposure unit for projecting and exposing the film image on to the photosensitive material, said projection exposure unit including:
 a light source,
 a light modulating filter for modulating light from said light source to be irradiated on the film, and
 a printing lens for imaging the film image on the photosensitive material;

reader means for reading image information of the film image;

an image exposure unit for exposing the photosensitive material with image information externally received at a position away from said projection exposure unit;

a control unit connected to said projection exposure unit, said image exposure unit as well as to said reader means, said control unit including;
 a first exposure calculating unit for calculating a corrected exposure amount from film image information provided from said reader means and also for adjusting said light modulating filter based on said corrected exposure amount, and
 a second exposure calculating unit for dividing the image information into a plurality of areas together constituting one frame of the film, then effecting an exposure correction individually on each of said plurality of areas and outputting the corrected film image information to said image exposure unit;

correction information instructing means for instructing correction information to said second exposure calculating unit; and exposure mode instructing means for providing selection between a projection exposure mode where the photosensitive material is exposed by said projection exposure unit and an image exposure mode where the photosensitive material is exposed by said image exposure unit.

3. An image printer as claimed in claim 2, wherein said reader means includes a CCD line sensor for reading in series the image information of the plurality of areas together constituting one film frame.

4. An image printer as claimed in claim 2, wherein said exposure mode instructing means selects said image exposure mode when said exposure information instructing means instructs the correction information to said second exposure calculating unit.

5. An image printer as claimed in claim 2, further comprising:

transport means for transporting the photosensitive material through said projection exposure unit and said image exposure unit, said transport means including drive means controlled by said control unit.

6. An image printer as claimed in claim 5, wherein said drive means includes a first motor for transporting the photosensitive material to said projection exposure unit and a second motor for transporting the photosensitive material to said image exposure unit, said control unit is capable of controlling said first motor and said second motor independently of each other.

* * * * *